Jan. 3, 1939.   A. E. LAMARTHE   2,142,904
CLOSING DEVICE FOR RECEPTACLES
Filed May 11, 1938   3 Sheets-Sheet 1
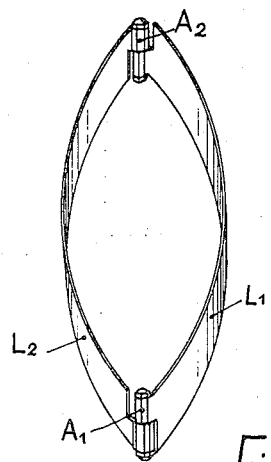
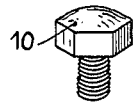
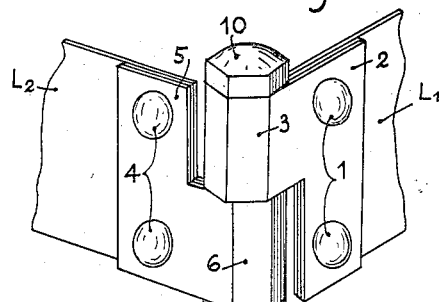
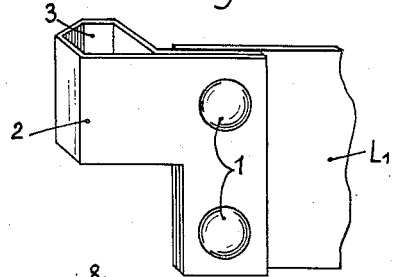
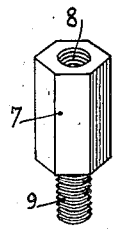
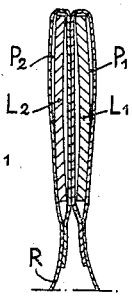
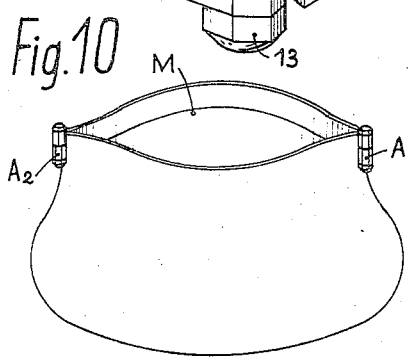
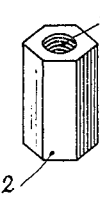
Inventor: LAMARTHE
Alfred, Edouard
by CA Snow&Co.
Attorneys.

Jan. 3, 1939.   A. E. LAMARTHE   2,142,904
CLOSING DEVICE FOR RECEPTACLES
Filed May 11, 1938   3 Sheets-Sheet 2
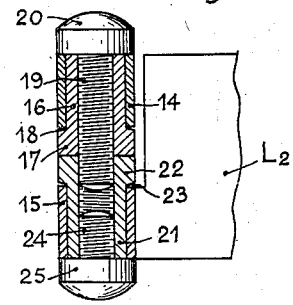
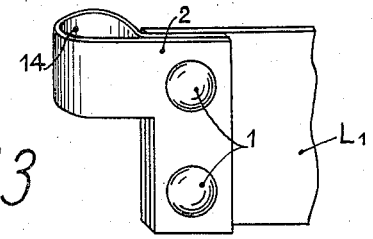
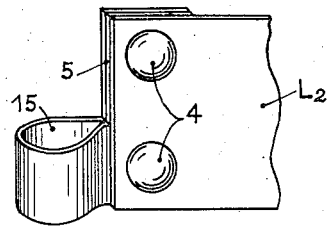
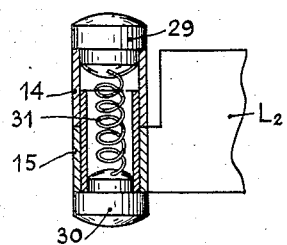
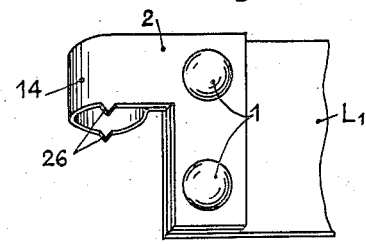
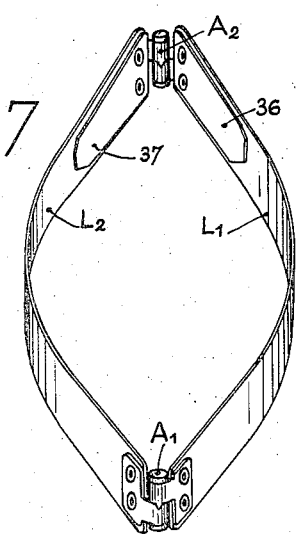
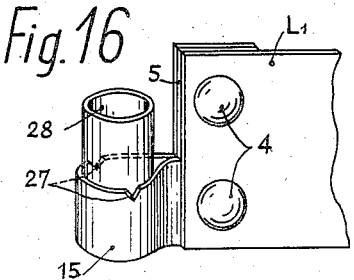
Inventor: LAMARTHE
Alfred, Edouard
by C. A. Snow & Co.
Attorneys.

Jan. 3, 1939.  A. E. LAMARTHE  2,142,904
CLOSING DEVICE FOR RECEPTACLES
Filed May 11, 1938   3 Sheets-Sheet 3

Inventor: LAMARTHE
Alfred, Edouard
by C.A.Snow&Co.
Attorneys.

Patented Jan. 3, 1939

2,142,904

UNITED STATES PATENT OFFICE 2,142,904

CLOSING DEVICE FOR RECEPTACLES

Alfred Edouard Lamarthe, Paris, France, assignor to Fa-Cile Fastener Corporation, New York, N. Y., a corporation of New York Application May 11, 1938, Serial No. 207,402
In Luxemburg July 28, 1937

6 Claims. (Cl. 150—10)

The present invention relates to hermetic and quick closing devices for use in connection with receptacles, and especially bags, purses, tobacco pouches and other similar articles, of the type including, on each side of the opening which is to be closed, at least one spring band or lip member which, by cooperation with the other spring band or lip member, keeps resiliently applied against each other the lips or edges of the orifice.

With devices of this kind, it is necessary, when the orifice of the bag or other receptacle has been opened, for instance by compression between the thumb and the forefinger of one hand, to maintain this compression for the whole time for which the receptacle is to remain open. Thus this hand is occupied and cannot perform any task.

The object of the present invention is to provide a closing device of the type above described which obviates this drawback.

According to the essential feature of the present invention, the corresponding ends of cooperating spring bands are connected by means which may be a hinge or the like which makes it possible, once the bands in question have been curved outwardly away from each other, to lock said bands in at least one open position.

Owing to this arrangement, the receptacle remains open without the necessity of maintaining any compression on the ends of the bands.

According to another characteristic of the present invention, in order to maintain the lip members e. g. blades or bands symmetrical with each other in the opened position, each end of the spring bands may be rigid with the corresponding end of a rigidifying or counter spring device.

Other features of the present invention will appear from the following detailed description of some specific embodiments thereof.

Preferred embodiments of the present invention will be hereinafter described, in order to illustrate the principles of the invention, with reference to the accompanying drawings in which:

Fig. 1 is a perspective view, in a position corresponding to the opening of the receptacle, of two spring bands provided with locking means according to the invention;

Fig. 2 is a corresponding partial view on an enlarged scale;

Figure 18:
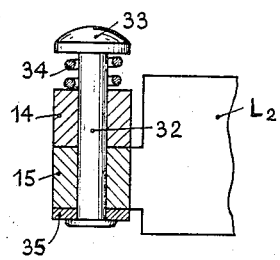
Figure 23:
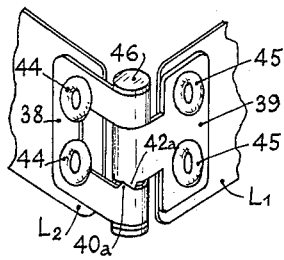
Figure 19:
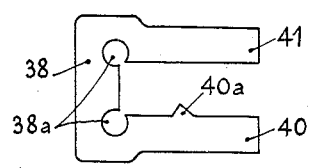
Figure 20:
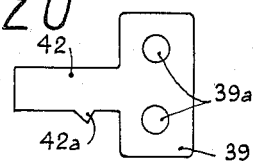
Figure 21:
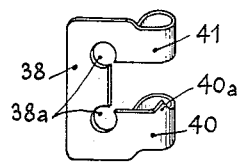
Figure 22:
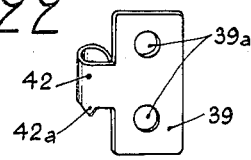
Figure 27:
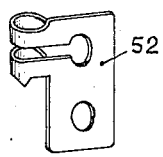
Figure 24:
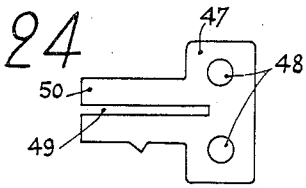
Figure 26:
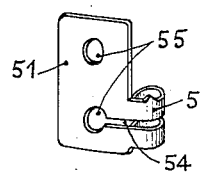
Figure 25:
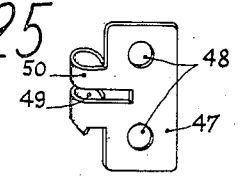

Figs. 3 to 8 inclusive are perspective views of the various elements of the device, seen separately;

Fig. 9 is a transverse sectional view of the upper part of a receptacle provided with the device according to the invention;

Fig. 10 shows a purse kept in the open position by the device according to the invention;

Fig. 11 shows, in axial section, a modification of the hinge;

Figs. 12 and 13 are perspective views of the corresponding ends of the two spring bands;

Fig. 14 is an axial section of another modification of the hinge;

Figs. 15 and 16 are perspective views of the corresponding ends of the two spring bands of the device shown by Fig. 14;

Fig. 17 is a perspective view of a device according to the invention and provided with counter spring devices;

Fig. 18 shows, in section, a modification of a hinge according to the invention;

Figs. 19 and 20 show, flatwise, the elements intended to constitute the cooperating knuckles shown by Figs. 21 and 22;

Fig. 23 is a perspective view of these knuckles in working position and assembled to the spring bands;

Figs. 24 and 25 respectively show, in the flat state and after rolling, another embodiment of a knuckle according to the invention;

Figs. 26 and 27 show, in perspective view, another embodiment of cooperating knuckles, respectively.

The two spring bands L1 and L2, fixed to the edges of the orifice of the receptacle, which serve to hermetically and quickly close said orifice, are connected together at each end by a hinge A1, A2, only one of which, shown in detail in Fig. 2 on an enlarged scale will be hereinafter described.

On one of the ends of blade or band L1, there is fixed, for instance by means of rivets 1, a hinge leaf or piece 2 (Fig. 4) constituted by a metal sheet suitably cut and folded and forming a knuckle 3 provided on the inside with flat faces with which cooperate the sides of a hexagonal piece 7. On the corresponding end of spring band L2, there is fixed, by means of rivets 4, a hinge leaf or piece 5 (Fig. 6) which constitutes a similar knuckle 6, of the same section as knuckle 3. Piece 7 (shown separately in Fig. 5) provided with a screw-threaded hole 8, engaged in knuckle 3 has five of its faces applied against the corresponding inner faces of said knuckle 3. This piece 7 is rigid with a threaded rod 9, and it is kept in position by a screw 10 screwed in hole 8 and the head of which bears against the upper edge of knuckle 3.

On rod 9, there is tightly screwed a part 12 of hexagonal transverse section corresponding to that of knuckle 6. The latter surrounds part 12 in a position such that it makes, with piece 2 rigid with band L1, an angle corresponding to a sufficient opening of the orifice of the receptacle.

Finally, a screw 13 is screwed in the screw threaded hole 11 of part 12, keeping the whole assembled.

Hinge A2 is made in a similar manner. However, it may be advantageous to provide each spring band at one end with a threaded rod and at the other end with a nut in such manner as to balance stresses.

It will be readily understood that bands L1 and L2 are kept in the opened position shown by Fig. 1 by wedging of the threads of part 12 on threaded rod 9 and the corresponding element of hinge A2. The direction of the threads of screw 9 is such that any movement of the middle portions of spring bands L1, L2 toward each other releases the whole by unscrewing of the part 12 from the threaded rod 9. Therefore, it suffices to press these spring bands slightly toward each other and once the locking means have been released, the bands snap back into the closed position.

The spring bands L1, L2 (Fig. 9) are secured to the edges of the orifice of receptacle R in any suitable manner, for instance by being inserted into pockets P1, P2 carried by said edges.

Fig. 10 shows a purse M kept in the opened position by the device according to the invention. The hinges A1, A2 which connect the spring bands project laterally from the purse.

It should be noted that the internal section of knuckles 5 and 6 might be different. As a matter of fact, the only function of these knuckles is to keep in a fixed angular position threaded rod 9 and its part 12. It is therefore preferable to provide, as illustrated, knuckles the inner walls of which are provided with polygonal faces which, by cooperating with the external surface of the cooperating nuts, prevent any relative rotation.

The provision of flat faces regularly distributed about the axis of the threaded rod and consequently of flat faces similarly provided on the inner wall of the knuckle facilitates the adjustment of the opening of the receptacle when assembling the parts. This is due to the fact that it is easy to appreciate to what increase of the angle of aperture corresponds a rotation of knuckle 6 with respect to the nut, especially if this rotation has for its effect to bring one of the flat faces of the knuckle into contact with the flat face of the nut adjacent to that with which it was precedingly in contact.

In the embodiment of Figs. 11 to 13, part 2 (Fig. 12) fixed on spring band L1 by rivets 1, constitutes a cylindrical sleeve 14, whereas piece 5, fixed by rivets 4 to the end of band L2, also constitutes a cylindrical sleeve 15.

In these two sleeves are engaged two cylindrical members 16 and 21, respectively, including portions of larger diameter 17 and 22 through which they are in contact with each other and which are provided with shoulders 18 and 23 the edges of which are milled or striated with a view to increasing adhesion. A screw 19, the head 20 of which bears against the edge of sleeve 14, is screwed in member 16, which is thus kept in suitable fixed angular position with respect to sleeve 14 owing to the provision of the bearing surface 18. Piece 22 is engaged on the end of screw 19. It is held in fixed angular position with respect to sleeve 15 by a screw 24 the head 25 of which is applied against the edge of said sleeve 15 so as to apply the opposite edge of said sleeve against bearing surface 23.

The working of this device is identical to that of the first embodiment above described.

In the embodiment of Figs. 14 to 16, sleeve or knuckle 14 is provided, on its lower edge with two teeth 26 (Fig. 15) whereas the corresponding edge of sleeve or knuckle 15 is provided with two notches 27 intended to cooperate with said teeth (Fig. 16). A tubular element 28 rigid with sleeve 15 constitutes the spindle or pintle about which sleeve 14 is journalled. Two plugs 29, 30, having projecting heads, interconnected by a spiral spring 31, keep the corresponding edges of sleeves 14 and 15 in contact with each other, and, in particular, they lock them in angular position with respect to each other when teeth 26 have engaged into hollows 27. This locking corresponds to a given position of opening of the spring bands. Of course, it is possible to provide a plurality of positions of opening by providing other locking teeth.

In the embodiment shown by Fig. 17, blades or strips L1, L2 are rigidly assembled, at their ends adjacent to hinge A2, with counter spring devices 36, 37. In like manner, they are provided, near hinge A1, with similar counter spring devices which are not visible. These counter spring devices, which bear, through their free ends, against the internal wall of blades L1, L2, ensure always a symmetrical shape thereof in the opened position. Of course, these means are applicable to all the embodiments above described, and also to those which will be hereinafter described.

In the embodiment diagrammatically shown in section in Fig. 18, knuckles or sleeves 14 and 15 are held in position with respect to each other by means of a cylindrical pin 32, and a spring 34 engaged between the head 33 of said pin and the top edge of sleeve 14 keeps the adjoining edges of sleeves 14 and 15 in contact with each other. A disc 35 is riveted on the opposite end of said pin.

For practical purposes, the assembly of hinges provided with springs of this kind has proved particularly delicate. In order to obviate this difficulty, I have provided the hinge elements shown by Figs. 21 to 27.

The hinge shown by Fig. 23 includes two metal elements, shown in the flat state by Figs. 19 and 20 respectively. One of them, 38, is provided with two parallel arms 40, 41, one of which, 40, is provided with a tooth 40a having an inclined edge. Two holes 38a opening into the angles of these arms give them a certain elasticity, so that they can be forced away from each other axially. The other metal fitting 39 is provided with an arm 42 providing with a corresponding tooth 42a. It is provided with two holes 39a. The arms 40, 41 and 42 of these metal fittings are then curved as shown by Figs. 21 and 22, so as to form the two sleeves which constitute the knuckles of the hinge. In the example, the iron fittings or hinge leaves 38, 39 are fixed respectively by means of rivets 44, 45 on blades L2, L1. A spindle or pintle 46, having projecting heads, of a length slightly longer than that of the sleeve 38 serves to assemble these sleeves together. The hinge is locked in the opened position owing to the cooperation of teeth 40a and 42a, respectively.

Figs. 24 and 25 show, in the flat state, and after bending, another embodiment of an iron fitting or hinge leaf with which the leaf 38 is to cooperate. It is constituted by an element 47 provided with holes 48, a slot 49 being provided in arm 50, in such manner as to give the latter a certain axial elasticity i. e. in a direction parallel to the axis of the assembling spindle or pintle 46.

Figs. 26 and 27 show two cooperating iron fittings 51, 52 only one of which, to wit 51, will be described. Its arm 53 is provided with a slot 54 which opens into one of the holes 55 of this fitting. Such an arrangement increases the axial elasticity of the arm.

It will be noted that in its preferred form, the invention contemplates the provision of lip members which may be employed to support the side walls of a bag or the like at the mouth thereof, these lip members being pivotally connected on axes which are transverse to the general plane of the bag mouth. The plane of the bag mouth is of course that plane which is defined by the terminal edges of the bag when the mouth of the latter is opened.

While I have, in the above description, disclosed what I deem to be practical and efficient embodiments of the present invention, it should be well understood that I do not wish to be limited thereto as changes may be made in the arrangement, disposition, and form of the parts without departing from the principle of the present invention as comprehended within the scope of the claims ultimately appended hereto.

What I claim is:

1. A closure device comprising a pair of elongated resilient members, said members being normally substantially straight longitudinally and substantially of the same length and normally disposed in closely juxtaposed relation, said members being joined at each end thereof, respectively, by a pivotal connection which permits mutual angular movement of said members, by flexure thereof, to form a generally mouth-shaped opening defined by said members in their flexed position and to close said opening, said pivotal connection being provided with rotatably mounted means to releasably lock said members at a predetermined flexed position.

2. A closure device comprising a pair of elongated resilient strips having surfaces defined by the width and length thereof, said strips being normally substantially straight longitudinally and substantially of the same length and normally disposed with said surfaces in closely juxtaposed relation, said strips being joined at each end thereof, respectively, by a pivotal connection which permits mutual angular movement of said strips, by flexure thereof, to form a generally mouth-shaped opening defined by said strips in their flexed position and to close said opening, said connection comprising rotatably mounted members joined, respectively, to said strips and adapted for angular movement about an axis, said members being respectively provided with complementary parts which releasably engage each other upon a predetermined angular movement thereof to releasably lock said strips in a flexed position.

3. A closure device comprising a pair of elongated resilient members normally disposed in abutting relation, said members being joined at each end thereof by a connection which permits mutual angular movement of said members, by flexure thereof, to form a generally mouth shaped opening defined by said members in their flexed positions, said connection being provided with means to releasably lock said members in a predetermined flexed position, said means comprising a hinge having leaves, joined respectively to said members, and a bearing knuckle carried by each leaf, each knuckle being mounted on a pintle to rotate about the axis thereof, complementary parts on said knuckles for axial engagement and means to releasably engage said complementary parts in said predetermined flexed position.

4. A closure device comprising a pair of elongated resilient members normally disposed in abutting relation, said members being joined at each end thereof by a connection which permits mutual angular movement of said members, by flexure thereof, to form a generally mouth shaped opening defined by said members in their flexed positions, said connection being provided with means to releasably lock said members in a predetermined flexed position, said means comprising a hinge having leaves, joined respectively to said members, and a bearing knuckle carried by each leaf, each knuckle being mounted on a pintle to rotate about the axis thereof, complementary parts on said knuckles having axial engagement and means formed in at least one of said leaves imparting axial resiliency to said leaf to releasably engage said complementary parts in said predetermined flexed position, said pintle being of such a length as to permit such axial engagement.

5. A closure device comprising a pair of elongated resilient members normally disposed in abutting relation, said members being joined at each end thereof by a connection which permits mutual angular movement of said strips, by flexure thereof, to form a generally mouth shaped opening defined by said strips in their flexed positions, said connection being provided with means to releasably lock said members in a predetermined flexed position, said connection comprising rotatably mounted parts joined respectively to said members and adapted for angular movement about an axis, said parts being provided with complementary oppositely threaded portions which, upon a predetermined angular movement of said members, engage and lock to releasably maintain said members in said predetermined flexed position.

6. A closure device comprising a pair of elongated resilient members, said members being normally substantially straight longitudinally and substantially of the same length and normally disposed in closely juxtaposed relation, said members being joined at each end thereof, respectively, by a pivotal connection which permits mutual angular movement of said members, by flexure thereof, to form a generally mouth-shaped opening defined by said members in their flexed position and to close said opening, said pivotal connection being provided with rotatably mounted, axially displaceable means to releasably lock said members at a predetermined flexed position.

ALFRED EDOUARD LAMARTHE.